United States Patent [19]
Impey

[11] Patent Number: 4,640,302
[45] Date of Patent: Feb. 3, 1987

[54] DOUBLE DISC GATE VALVE

[76] Inventor: Thomas T. Impey, 631 Camelia St., Berkeley, Calif. 94710

[21] Appl. No.: 871,802

[22] Filed: Jun. 9, 1986

[51] Int. Cl.[4] .................... F16K 43/00; F16K 3/06; F16K 25/00

[52] U.S. Cl. .................... 137/15; 137/315; 251/178; 251/195

[58] Field of Search .......... 137/15, 315; 251/177, 251/178, 193, 195, 326, 327, 328, 329

[56] References Cited

U.S. PATENT DOCUMENTS

| | | | |
|---|---|---|---|
| 1,189,950 | 7/1916 | Hunter | 251/178 |
| 1,257,020 | 2/1918 | Patterson | 251/178 |
| 1,324,351 | 12/1919 | Haynes | 251/195 |
| 1,632,220 | 6/1927 | Demarest | 251/178 |
| 1,763,029 | 6/1930 | Wilson | 251/178 |
| 1,991,006 | 2/1935 | Wilson | 251/177 |
| 2,443,929 | 6/1948 | Patterson | 251/178 |
| 3,504,885 | 4/1970 | Hulsey | 251/328 |
| 3,542,338 | 11/1970 | Scaramucci | 251/328 |
| 4,440,381 | 4/1984 | Tipton, Jr. | 251/328 |

*Primary Examiner*—George L. Walton
*Attorney, Agent, or Firm*—Bruce & McCoy

[57] ABSTRACT

An improved double disc gate valve having sealing rings which engage the internal discs of the reciprocating gate and in which one of its discs and its sealing ring can be replaced with only partial disassembly of the valve.

4 Claims, 4 Drawing Figures

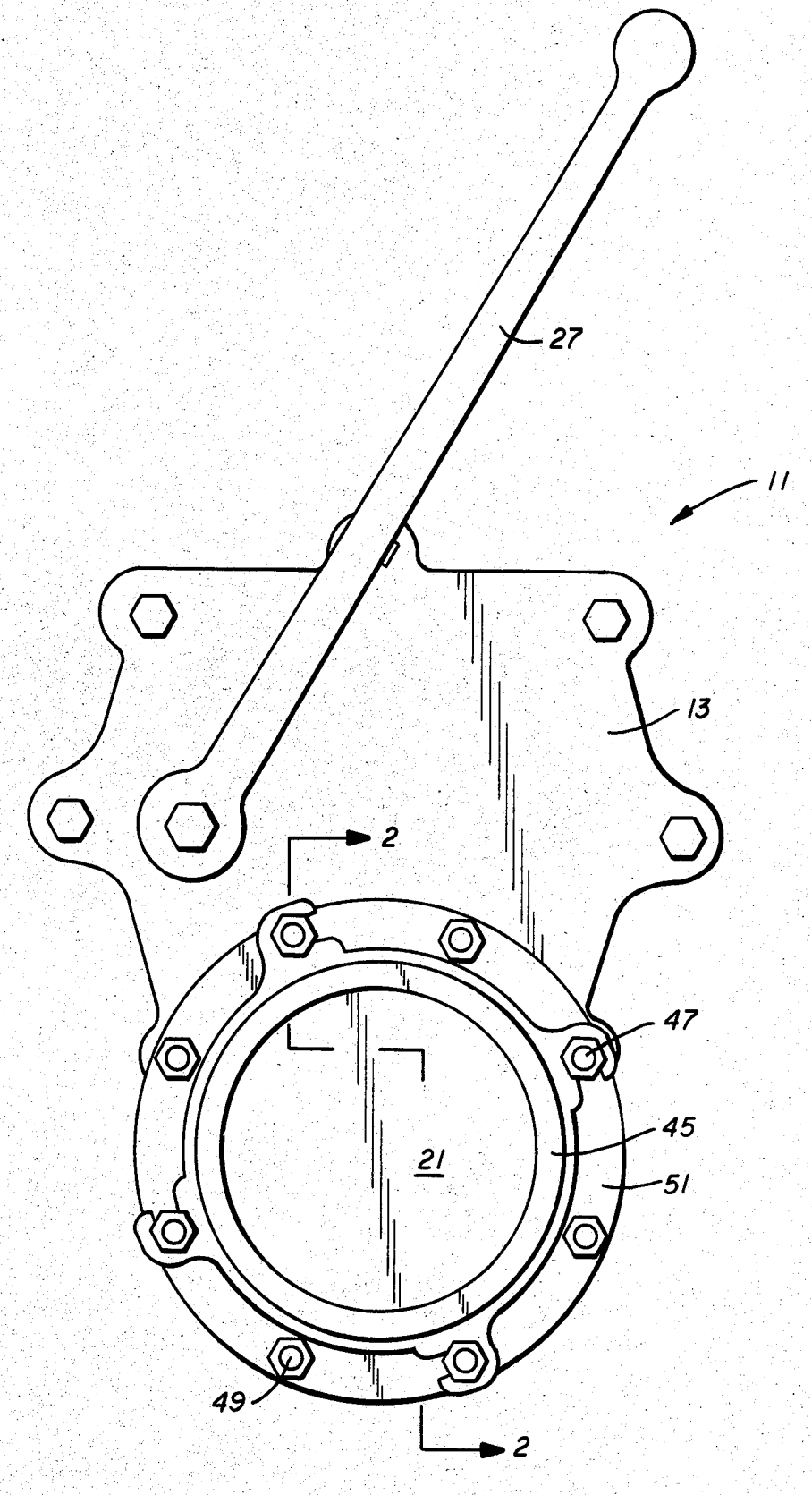
FIG._1.

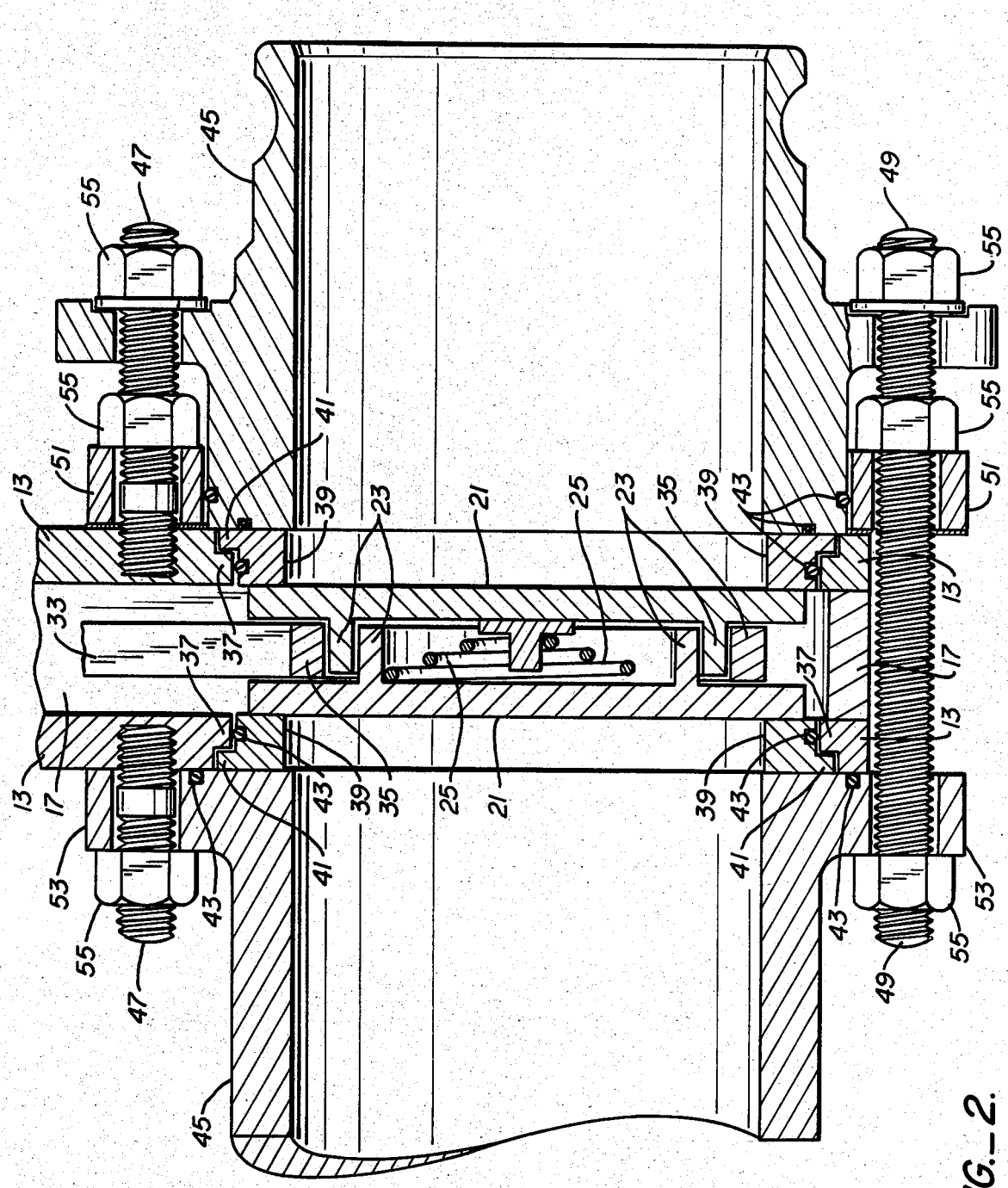
FIG._2.

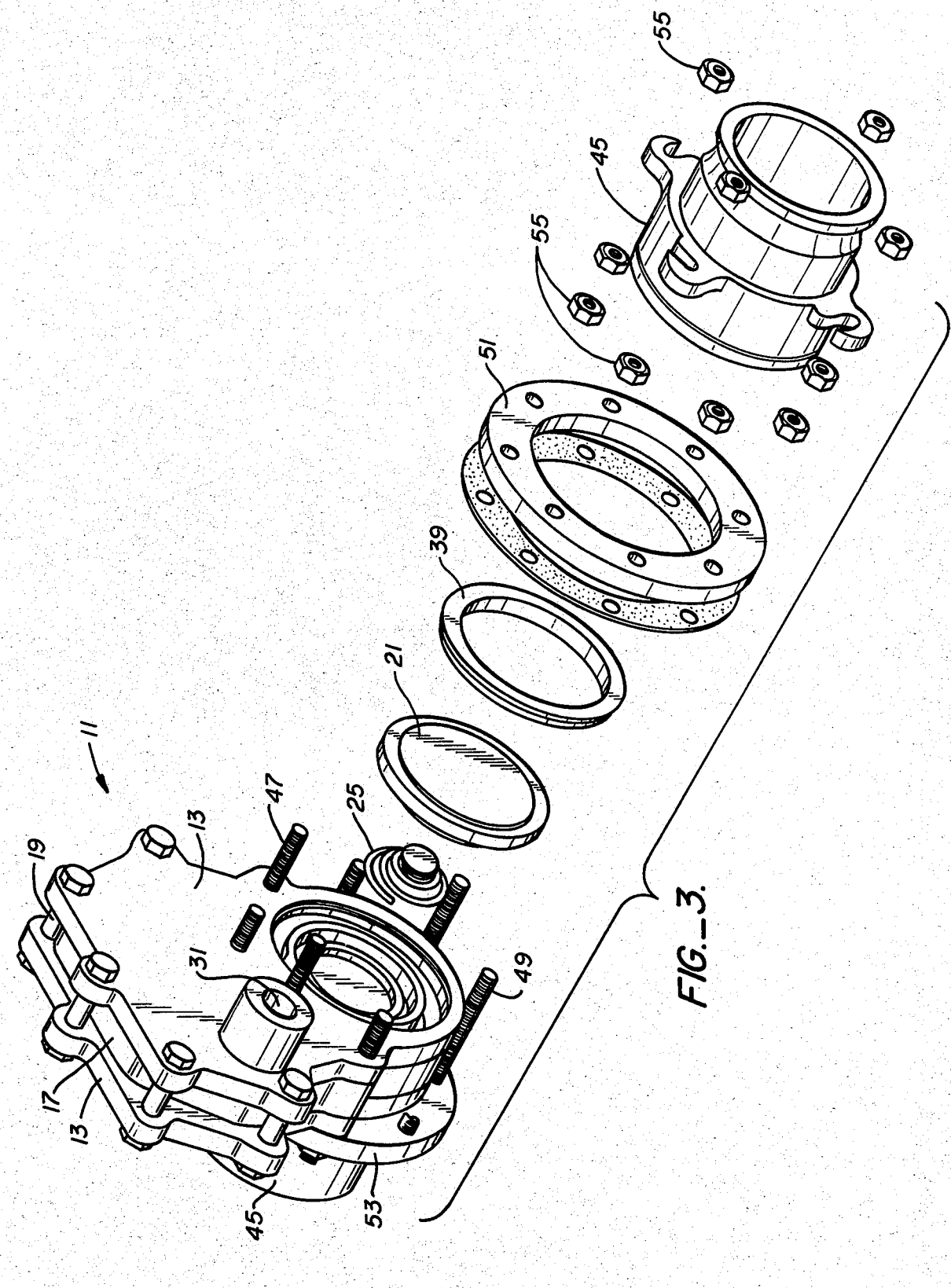

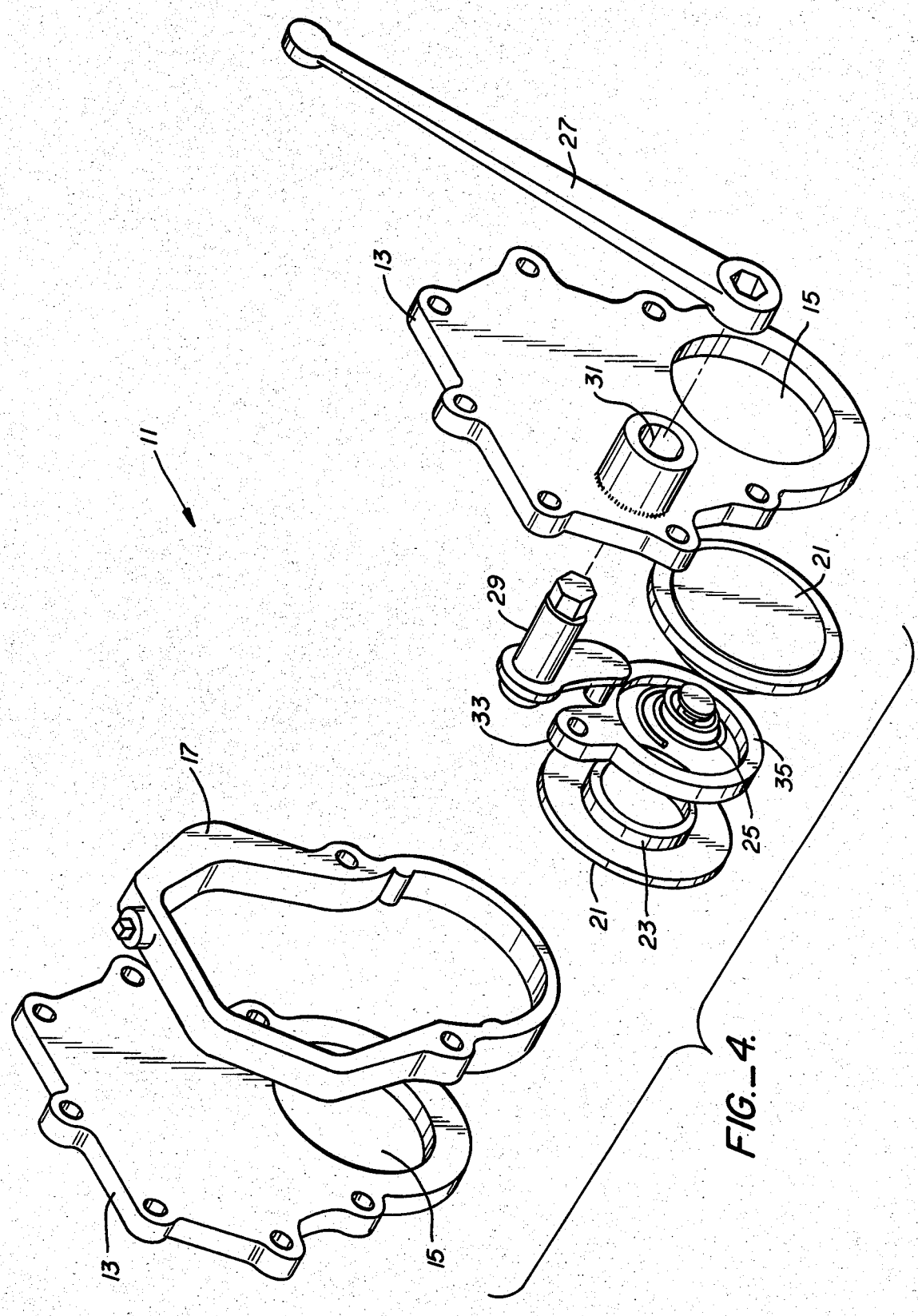
FIG._4.

4,640,302

DOUBLE DISC GATE VALVE

BACKGROUND OF THE INVENTION

1. Field of the Invention

The present invention relates to double disc gate valves and more particularly to an improved double disc gate valve having a sealing ring and disc which can be replaced without complete disassembly of the valve.

2. Description of the Prior Art

There are innumerable designs of gate valves some of which may have been in use possibly centuries ago. With respect to the present invention, gate valves very similar to it have been in use for ten years or more. The old and new designs are almost identical, but in the old prior art design it is necessary to disassemble the whole valve in order to rebuild it because the sealing rings and internal discs can not be removed without disassembly. In order to be able to disassemble the old valve, it is necessary to remove it from its working location and take it to a repair facility. The present invention permits partial rebuilding in situ.

Gate valves are particularly adapted for use in situations where they control the flow of a fluid by being disposed in either the fully open or fully closed condition. They are not as efficient as other types of valves for regulating the volume of flow of a fluid. When a gate valve is used to control the flow of a corrosive fluid, they rapidly deteriorate and must have the seals re-established often. Generally these types of fluids are usually toxic and hazardous waste fluids.

Prior art gate valves of the type which have been used for a decade or more in situations involving corrosive fluids have required frequent rebuilding because they quickly begin to leak. Obviously, leakage is especially unacceptable where toxic and hazardous fluids are involved. It has been discovered by the inventor that partial rebuilding of a leaking valve in a particular way will in most cases stop the leak. This is done by replacing one of the internal discs of the valve and a related sealing ring. This partial rebuild or repair permits a valve to be utilized for two or three and in some cases even more life expectancies without complete rebuilding. This is a substantial savings in replacement parts and labor, and if that repair can be accomplished without the necessity of removing the valve from its working environment, additional substantial cost savings can be effected by a reduction of equipment downtime.

The realization that this improvement can be obtained is an inherent portion of this invention as well as the structure by which this result is achieved. Prior to this time it was not recognized that the valves could be renovated without removing the valve and replacing or repairing all of the parts in a complete rebuild at a repair facility remote from the operative location of the valve.

SUMMARY OF THE INVENTION

The present invention is an improved double disc gate valve. It has a body portion including a pair of side wall plates and a hollow spacer disposed between the side wall plates which defines a cavity within which the discs that form the gate for said valve reciprocate. The side wall plates are formed with aligned circular openings for permitting the flow of fluid through the valve. The openings include a pair of circular flanges which project radially inward from the periphery of the openings adjacent the internal cavity bracketed by said plates.

A pair of equal diameter flanged sealing rings are formed to fit within the circular openings formed in the side wall plates. The flanges of the sealing rings are formed to overlap and engage the internal flanges of said side wall plates to position the sealing rings with respect to the cavity. The sealing rings also include O ring seals to prevent fluid passing through the junction between the sealing rings and the side wall plates.

A pair of discs which form the movable gate for the valve are disposed in the cavity formed between the side wall plates. The discs are smaller in diameter than the circular openings formed in the side wall plates and larger in diameter than the inner diameter opening of the sealing rings. The discs are formed with a pair of hollow opposed projecting cylindrical flanges of different diameters whereby the flange of one disc nests within the flange of the other disc.

Spring means are disposed between the discs urging them apart, and means are provided for holding the sealing rings in seated position in the side wall plates. Means are also provided for reciprocating the discs in the cavity from a closed position disposed between the sealing rings to an open position which permits the flow of fluid axially through the sealing rings.

The present invention also includes the method for repairing leaks in a double disc gate valve without disassembly of the valve. It includes the steps of providing the valve with at least a downstream sealing ring and gate disc which can be removed from the valve and replaced with new parts when the outlet connection is disconnected from the valve and replacing only the downstream sealing ring and gate disc of the valve when it begins to leak.

OBJECTS OF THE INVENTION

It is therefore an important object of the present invention to provide an improved double disc gate valve which can be at least partially rebuilt without fully disassembling the valve.

It is another object of the present invention to provide a double disc gate valve which can be made accessible for repair in its operative position by disengaging only the downstream flow connector from said gate valve.

It is a further object of the present invention to provide a double disc gate valve in which at least one sealing ring and the related internal disc on the downstream side of the valve can be replaced while the gate valve is in operative position.

And it is still another object of the present invention to provide an improved double disc gate valve which can be repaired several times in its operative position to stop leaks without having to disassemble the whole valve for rebuilding.

Other objects of the invention will become apparent when the preferred embodiment of the invention is considered in conjunction with the accompanying drawings.

DESCRIPTION OF THE DRAWINGS

FIG. 1 is a front elevation of the double disc gate valve of the present invention;

FIG. 2 is a cross section in side elevation taken along the lines 2—2 of FIG. 1;

FIG. 3 is an exploded view in perspective of the valve of the present invention showing the valve partially disassembled as if it were being repaired per the method of the present invention; and FIG. 4 is an exploded view in perspective of the internal and operative mechanisms of the invention.

DESCRIPTION OF THE PREFERRED EMBODIMENT

The present invention is an improved double disc gate valve. It has a body portion 11 which includes a pair of side wall plates 13 which are formed with circular openings 15 for permitting the flow of fluid axially through the two side wall plates. The side wall plates bracket the internal mechanism which includes the operative members of the valve.

A hollow spacer 17 which is the central portion of the valve body is disposed between and bracketed by the side wall plates 13 and defines a cavity within which the gate of the valve reciprocates. The spacer 17 is of uniform thickness and has machined edges which mate with the internal faces of the side wall plates. Bolts 19 pass through or adjacent to the periphery of the side wall plates at spaced locations therearound to compress the spacer therebetween.

Reference is made to FIG. 2 to visualize the arrangement of parts in their operative position. The discs 21 which form the movable gate for the valve are disposed in the cavity formed between the side wall plates 13 and bounded by the spacer 17. The discs are smaller in diameter than the circular openings 15 formed in the side wall plates so that they can be removed therethrough. The discs 21 are provided with a pair of hollow opposed projecting cylindrical flanges 23 of different diameters whereby the flange of one disc nests within the flange of the other disc.

A spring means urges the discs apart. In the preferred embodiment a coiled spring 25 is disposed between the discs within the circular flanges 23.

A means is provided for reciprocating the discs 21 in the cavity from a closed position, wherein the discs are disposed between the openings 15 in the side walls, to an open position wherein the discs are retracted to permit the flow of fluid axially through the openings. In the open position the discs are moved into an upper portion of the housing 11 between the side wall plates 13 out of alignment with the openings.

Reference to FIG. 4 shows this mechanism for operating the discs and moving them between the open and closed positions. It includes a handle 27 which turns a valve crank 29 that is journalled 31 through a side wall plate and engages a lever arm 33 having a circular lower portion 35. The circular portion of the lever arm encircles the circular flanges 23 formed on the internal sides of the gate discs so that the discs move in response to the movement of the lever arm 33 up and down inside the hollow spacer 17.

Reference is made to FIG. 2 as the following details are not illustrated in FIG. 4. The side wall plates 13 include a pair of circular flanges 37 which project radially inward from the periphery of the openings which are formed in the side wall plates. These flanges 37 are disposed adjacent to the internal cavity bracketed by the plates. In practice they are integral to the side wall plates and are formed simply by milling a larger circular opening part way through each side wall plate from the external side.

A pair of flanged sealing rings 39 are formed to fit within the circular openings 15 formed in the side wall plates 13. The flanges 41 of the sealing rings 39 are formed to overlap and engage the internal flanges 37 of the circular openings in the side wall plates to position the sealing rings with respect to the cavity. The sealing rings 39 are equal diameter in the preferred embodiment and are therefore interchangeable for cost savings in manufacture. This also allows either side of the valve to be disposed facing downstream depending upon the requirements of the operating location. Downstream is the side of the valve which interfaces with the atmosphere. Either side of the valve can therefore be rebuilt depending which is on the downstream side.

The sealing rings 39 also include O ring seals 43 which prevent fluid from passing through the junction between the sealing rings and the side wall plates.

Means are provided for holding the sealing rings 39 in position in the openings in the side wall plates. Since the sealing rings are being urged out of their seats by the spring 25 disposed between the valve discs, the rings are held in position by a pair of compression members which urge the sealing rings into their seats which are formed in the side wall plates. In the preferred embodiment this is accomplished by the inlet and outlet connectors 45. These connectors include either studs 47 anchored in the side wall plates or bolts 49 which pass through the compression ring 51 and the flange 53 which force the side wall plates together around the openings formed in the side wall plates. The connectors 45 are held in place by means of nuts 55 screwed onto the studs 47 or bolts 49 which pass through the compression ring and flange.

These connectors are formed with openings for the flow of fluid therethrough which are smaller than the internal diameter of the sealing rings so they trap the rings on their seats. When the connectors are removed, the sealing rings are exposed and can be removed from their seats in the openings of the side wall plates and replaced. When one or both of the sealing rings are removed, the associated gate disc can also be removed and replaced.

In order to repair the valve to stop leaks, it is only necessary to replace the disc and sealing ring which are disposed on the downstream side of the valve. This is because the upstream side of the valve is never required to effect a seal. It can actually even be disposed in a partially open orientation because the pressure from the fluid will force that disc open until fluid pressure is equalized inside the valve. The only sealing requirement is for the downstream disc and sealing ring to maintain integrity. The only time the upstream side needs to seal is if it were desirable to pull a vacuum on the container, on the upstream side of the valve, whereby that disc and sealing ring would have to perform in a sealing relation. In actual practice, a dust cap is placed on the end of connector to effect the seal because of the possibility of a leaky upstream seal.

Thus, as a practical matter, in order to repair the valve in order to re-establish its integrity when it begins to leak, it is usually only necessary to pull the sealing ring and the disc on the downstream side and replace them. The valve can then be put through three or four and more similar life and repair cycles without removing the valve from operative position by simply replacing these two elements. In the present invention, that can be accomplished by disconnecting the downstream flow connector from the gate valve. That exposes the downstream sealing ring and disc for removal. They can be taken out of the valve and replaced because they are smaller in diameter than the opening in the side wall plate that they have to pass through. The fact that this partial repair is generally effective in stopping leaks is a novel discovery, and in conjunction with the particular configuration supplied by applicant, it amounts to a new and novel improvement in gate valve design for specific applications where corrosion of the sealing members of the valve occurs rapidly.

Thus, the invention also includes the method of repairing leaks in a double disc gate valve without disassembly of the valve. The method includes the steps of providing the valve with at least a downstream sealing ring and a gate disc which can be removed from the valve and replaced with new parts when only the outlet connection is disconnected from the valve. In order to accomplish this, the sealing ring and the gate disc are created smaller in diameter than the outlet opening in the gate valve and the sealing ring is held in place by the outlet connection. The leak is then repaired by replacing only the downstream sealing ring and gate disc of the valve when it begins to leak.

As a result of this new structure and method, it will be seen that the objects and advantages of the invention are achieved. While the preferred embodiment and method of the invention have been described in detail herein, the invention is not to be limited to such details as have been set forth except as may be necessitated by the appended claims.

I claim:

1. An improved double disc gate valve comprising a valve body including a pair of side wall plates and a hollow spacer disposed between said side wall plates defining a cavity within which the discs that form the gate for said valve reciprocate, said side wall plates being formed with aligned circular openings for permitting the flow of fluid through said valve, said openings including a pair of circular flanges which project radially inward from the periphery of said openings adjacent the internal cavity bracketed by said plates, a pair of equal diameter flanged sealing rings formed to fit within the circular openings formed in said side wall plates, the flanges of said sealing rings form to overlap and engage the internal flanges of said side wall plates to position said sealing rings with respect to said cavity, said sealing rings also including O ring seals to prevent fluid from passing through the junction between said sealing rings and said side wall plates, a pair of discs forming the movable gate for said valve and disposed between said sealing rings and mating therewith in said cavity formed between said side wall plates, said discs being smaller in diameter than the circular openings formed in said side wall plates and larger in diameter than the inner diameter of the openings of said sealing rings, said discs being formed with a pair of hollow opposed projecting cylindrical flanges of different diameters whereby the flange of one disc nests within the flange of the other disc, spring means disposed between said discs urging them apart, means holding said sealing rings in seated position in said side wall plates which when removed permits the removal of said sealing rings from their respective sidewall plates and the gate discs from the valve body cavity without disassemble of the valve body, and means for reciprocating said discs in said cavity from a closed position disposed between said sealing rings to an open position which permits the flow of fluid axially through said sealing rings.

2. The gate valve of claim 1 wherein the means for holding said sealing rings in said side wall plates includes a pair of compression members which urge the sealing rings into their seats formed in said side wall plates and which, when removed, expose the sealing ring and associated gate disc for removal and replacement.

3. A method for repairing downstream leaks in a double disc gate valve having upstream and downstream sealing rings and mating discs for each in the valve gate without disassembly of the valve including the steps of providing the valve with at least a downstream sealing ring and a removable gate disc which are retained in the gate valve by an outlet connection and the downstream sealing ring and that disc of the valve gate which is mated with it can be removed from the valve and replaced with new parts when the outlet connection is disconnected from the valve, and replacing only the downstream sealing ring and the removable gate disc of the valve when it begins to leak.

4. The method of claim 3 wherein the sealing ring and gate disc are smaller in diameter than the outlet opening in the gate valve and the sealing ring is held in place by the outlet connection.

* * * * *